H. L. SMITH.
BLANK HOLDING SPINDLE FOR WOOD SCREW MACHINES.
APPLICATION FILED SEPT. 17, 1915.
1,170,693. Patented Feb. 8, 1916.
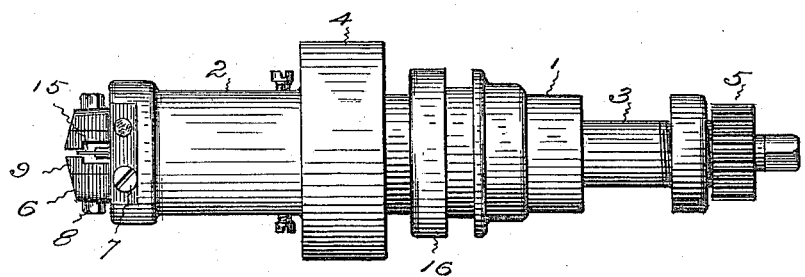
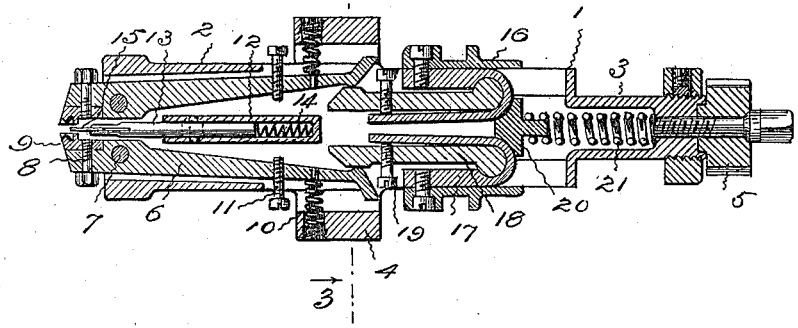
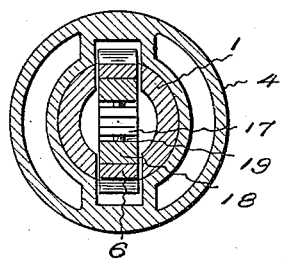

UNITED STATES PATENT OFFICE.

HENRY L. SMITH, OF WATERBURY, CONNECTICUT, ASSIGNOR TO THE E. J. MANVILLE MACHINE COMPANY, OF WATERBURY, CONNECTICUT, A CORPORATION OF CONNECTICUT.

BLANK-HOLDING SPINDLE FOR WOOD-SCREW MACHINES.

1,170,693.   Specification of Letters Patent.   Patented Feb. 8, 1916.

Application filed September 17, 1915. Serial No. 51,173.

*To all whom it may concern:*

Be it known that I, HENRY L. SMITH, a citizen of the United States, residing at Waterbury, in the county of New Haven and State of Connecticut, have invented a new and useful Improvement in Blank-Holding Spindles for Wood-Screw Machines, of which the following is a specification.

This invention relates to the spindles which in wood screw machines receive, hold and rotate the blanks while they are being pointed and threaded. In these spindles there are blank holding jaws carried by levers which are opened to receive the blanks to be threaded, closed to hold the blanks while being threaded and opened to discharge the threaded blanks. These jaws have to be adjusted very closely so that they will grip the blanks tightly and hold them firmly, and the levers to effect this are usually either made yielding in themselves, or the lever closing means are yielding so that the gripping force of the jaws may be accurately controlled. The space, of course, for these parts is very limited in the spindles, and there is much wear on the parts and the yielding means are frequently broken.

The object of the invention is to provide a spindle of this nature which is simple, cheap and efficient.

To attain the object of this invention firm jaw holding levers with long limbs are provided and these are engaged for closing the jaws by independently adjustable wedges that are loosely mounted in and are carried by relatively long curved springs which are fastened to and move with the sleeve that travels back and forth at the proper intervals on the spindle as the spindle is rotated, for the purpose of causing the wedges to swing the levers so they will close the blank holding jaws and release the levers so the jaws will open.

Figure 1 of the accompanying drawings shows a side view of a spindle which embodies the invention. Fig. 2 shows a central longitudinal section. Fig. 3 shows a transverse section on the plane indicated by the dotted line 3—3 on Fig. 2.

The spindle 1 is generally circular in cross section with a journal section 2 for the front bearing and a journal section 3 for the rear bearing. The driving pulley 4 is usually fastened on the spindle near the middle, and a transmission pinion 5 is ordinarily fastened on the spindle near the rear end.

The levers 6 are hung in the recessed front end of the spindle on pivot studs 7. Fastened by screws 8 to the outer ends of these levers are jaws 9 which are recessed so that they will grip the heads of the screw blanks. Springs 10 arranged in sockets in the pulley tend to push the rear ends of the jaw levers inwardly and screws 11 are provided for limiting the inward movement of the rear ends of the levers.

In a socket 12 in the spindle between the levers is a plunger 13 that is thrust forwardly by a spring 14. At the outer end of this plunger is a tool 15 that may be a screw driver blade which will engage with the slot in the screw blank held by the jaws so as to insure the rotation of the blank with the spindle and also cause the ejection of the blank when the jaws are open after the blank has been pointed and threaded.

The sleeve 16 is moved back and forth along the spindle by the usual means. Fastened on the inside of the sleeve and lying in the mortise in the spindle are the ends of two spring yokes 17, in the curved portions of which are loosely held the rear ends of the wedges 18. Screws 19 are turned through the wedges against the spring ends of the yoke so that the expansive force of the wedges against the ends of the long limbs of the levers can be accurately determined. A block 20 thrust forward by a spring 21 arranged in the spindle presses against the curved sections of the yokes and tends to thrust forward the wedges and the sleeve by which they are carried.

Each wedge is carried by its own spring and acts independently against its lever so that its position with relation to, and the expansive pressure exerted against its lever can be accurately determined. The wedge holding springs are of sufficient length and are so shaped that without danger of breaking they afford the necessary expansive force with the requisite yielding to insure a firm grip of the jaws upon the screw blanks, and each wedge can be readjusted at any time to compensate for wear, or for change in the elasticity of its spring, or variation in the diameter of the blanks to be held by the spindle.

The invention claimed is:

1. A rotatory spindle having levers with blank holding jaws, a sleeve movable back and forth on the spindle, socketed springs attached to the sleeve, and wedges seated in said socketed springs and adapted to engage the levers for opening and closing the jaws.

2. A rotatory spindle having levers with blank holding jaws, independent wedges adapted to engage the levers and close the jaws, spring arms supporting and carrying the wedges, means carried by the wedges for adjusting the tension of the springs upon the wedges, and means for reciprocating the springs and wedges.

3. A rotatory spindle having levers with blank holding jaws, wedges adapted to engage the levers and close the jaws, springs supporting and carrying the wedges, and means for reciprocating the springs and carrying the wedges into and out of engagement with said levers.

4. A rotatory spindle having levers with blank holding jaws, a reciprocating sleeve, springs attached to and movable with the sleeve, and wedges mounted on and carried back and forth by said springs out of and into engagement with said levers.

5. A rotatory spindle having levers with blank holding jaws, springs thrusting against the levers for opening the jaws, independent wedges adapted to engage the levers and close the jaws, springs supporting and carrying the wedges, a reciprocatory sleeve carrying the springs, means carried by the wedges for adjusting the tension of the springs upon the wedges, and means for thrusting the springs and wedges and sleeve forward.

HENRY L. SMITH.

Copies of this patent may be obtained for five cents each, by addressing the "Commissioner of Patents, Washington, D. C."